United States Patent [19]
Finkel et al.

[11] 3,914,596
[45] Oct. 21, 1975

[54] INDUSTRIAL AUTOMATION LOCATING AND TRACKING SYSTEM

[75] Inventors: Joel Roberts Finkel, Wayland; E. Evert Basch, Newton; Edwin R. Bowerman, Topsfield, all of Mass.

[73] Assignee: GTE Laboratories, Incorporated, Waltham, Mass.

[22] Filed: July 24, 1974

[21] Appl. No.: 491,593

[52] U.S. Cl. ............... 250/203; 250/223; 250/227; 250/234
[51] Int. Cl.² ........................................... G01J 1/20
[58] Field of Search ........... 250/203, 223, 233, 234, 250/201, 202, 359, 360, 548; 356/28

[56] References Cited
UNITED STATES PATENTS

| | | | |
|---|---|---|---|
| 3,033,987 | 5/1962 | Hotham | 250/203 |
| 3,229,099 | 1/1966 | Schwinghamer et al | 250/201 |
| 3,462,610 | 8/1969 | Frost | 250/223 R X |
| 3,757,125 | 9/1973 | Okada et al. | 250/234 X |

*Primary Examiner*—James W. Lawrence
*Assistant Examiner*—E. R. La Roche
*Attorney, Agent, or Firm*—Irving M. Kriegsman; Bernard L. Sweeney

[57] ABSTRACT

The industrial automation locating and tracking system of the present invention utilizes light having a particular signature imposed thereon. This light is directed toward the general area of a moving object that is to be located and tracked. Each such moving object in the system has a retroreflective element mounted thereon. When the object enters the searching beam of light, the light is reflected back towards the source where it is focused on a position-sensitive detector. The output signal from the position-sensitive detector is then utilized to generate a tracking signal in order to move the support upon which the light source and position-sensitive detector are mounted synchronously with the moving object.

17 Claims, 2 Drawing Figures

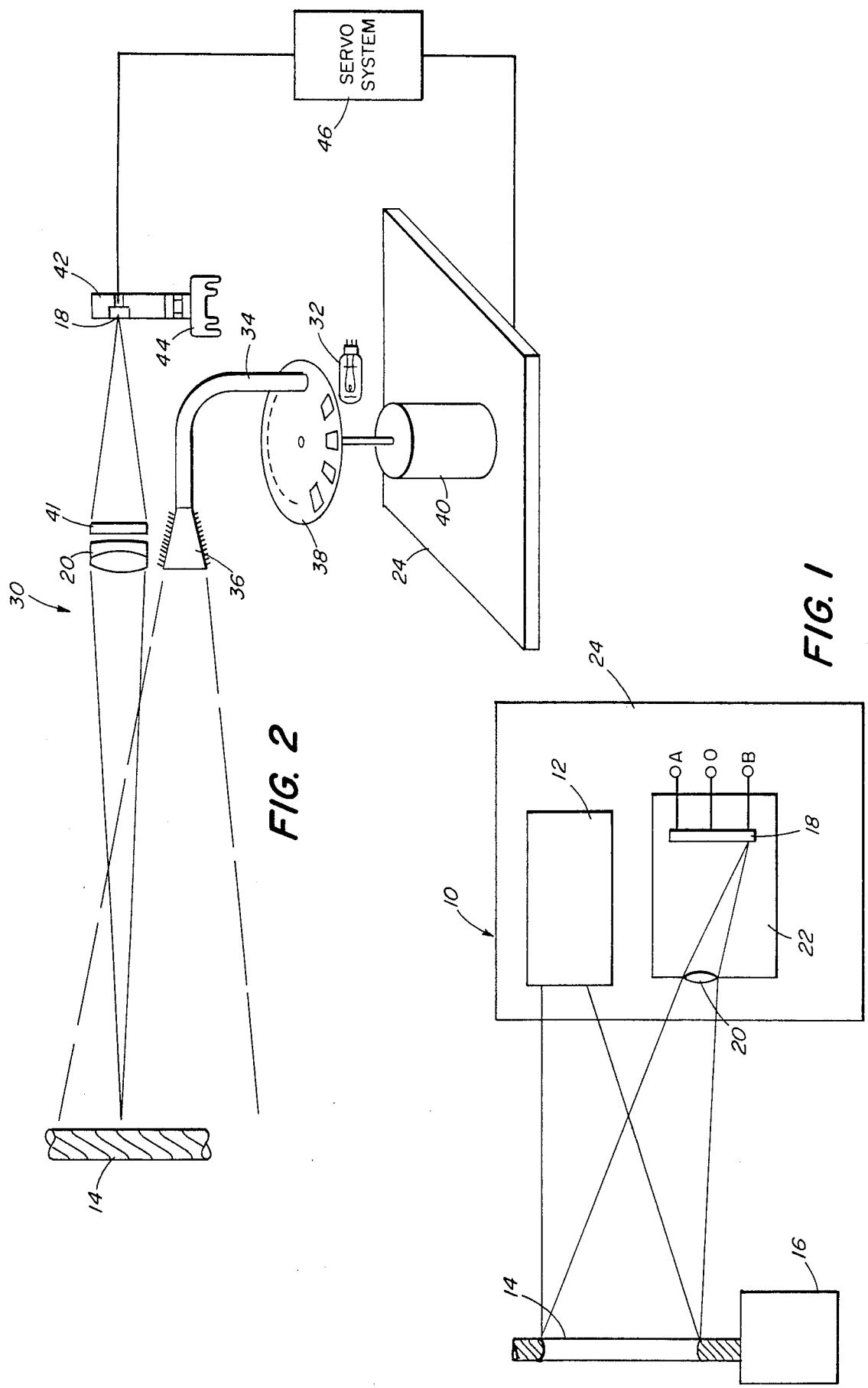

INDUSTRIAL AUTOMATION LOCATING AND TRACKING SYSTEM

BACKGROUND OF THE INVENTION

The present invention is concerned with industrial automation systems and is more particularly concerned with a novel locating and tracking system for use in industrial automation systems.

Modern industrial manufacturing methods have generated a wide variety of tasks which must be performed quickly and repetitively in order that the manufacturing operation can be efficiently accomplished. This evolutionary process has resulted in the creation of many such tasks for which it is difficult to acquire personnel willing to perform for a significant period of time. Research has determined that this is primarily due to boredom experienced by the worker. This boredom often also results in significant damage rates for the manufactured assemblies and consequent lower efficiency and higher costs.

It has, therefore, been the desire of manufacturing personnel that as many of these repetitious and unsophisticated tasks be mechanized or automated in some possible way such that human accomplishment of the task is generally eliminated. For example, in many industrial environments, interfaces exist between various conveyor lines and the product in various stages of assembly must be transfered physically from one conveyor line to the next. Were such conveyor lines to be operating synchronously, the task would be simplified in that direct interconnection of the two systems could be accomplished in order to transfer the product. However, in the general case, such lines are not operating at the same speed; therefore, direct interconnection of the lines is not possible. Presently, a worker is generally employed to physically take the assemblies from one conveyor line and transfer them to the other. Such a transfer, which often is accomplished on bulky items with an alteration in orientention of the assembly, is necessary and often must be accomplished at a rate of more than once per minute continuously over an entire work day.

Devices are available today for accomplishing the functions of transferring an assembly from one such conveyor line to another. However, accomplishing this function between two asynchronously moving systems requires the ability to locate accurately and to track a position or object in the on-loading conveyor system. Previously, a number of methods for accomplishing this function have been suggested. These methods include the use of radar, lidar, and various mechanical linkages. In addition, predictive computation is also a possible means for accomplishing this function. Radar and lidar are not generally acceptable in the industrial environment and also are not able to operate effectively at ranges under approximately 20 feet. Necessarily, the interfaces in an industrial environment are located at distances well under this limit. Mechanical linkages are indeed possible but often become quite complex and are damaged easily by the rapid movement of the machinery. Predictive computation depends upon the maintenance of precise relationships of velocity, acceleration and position within a greatly contrived environment. This is not always possible or desirable within a manufacturing operation and certainly is extremely costly.

SUMMARY OF THE INVENTION

It is, therefore, an object of the present invention to provide a novel industrial automation locating and tracking system which works effectively at short ranges, is not easily damaged, and which can locate and track non-uniformly moving objects in a typical industrial environment.

It is another object of the invention to provide such an industrial automation locating and tracking system which is basically simple in construction and which utilizes a minimum of moving parts such that high reliability and ease of operation are attained.

The present invention in its broadest aspect is an industrial automation locating and tracking system. The system includes a support which is movable generally parallel to the movement of an object which is to be located and tracked. A light source is mounted on the support and directs a beam of light toward the path of the object. A retroreflective element is mounted on the moving object and a position-sensitive photodetector is mounted on the support. Means are provided on the support adjacent to the light source for focusing light reflected by the retroreflective element onto the position-sensitive photodetector. The focus of the light on the position-sensitive photodetector and the output therefrom are indicative of the relative positions of the object and the support. Means are provided which are responsive to the output from the position-sensitive photodetector for bringing the support into synchronous movement with the moving object.

Further objects, advantages and features of the present invention will be apparent from the following detailed description of the preferred embodiments in conjunction with the associated drawing.

BRIEF DESCRIPTION OF THE DRAWING

In the drawing,

FIG. 1 is a schematic diagram of a simplified form of the present invention which is useful for explaining the principles of operation, and FIG. 2 is a schematic diagram of a locating and tracking system according to the present invention in which specific means for performing the various functions are shown.

DETAILED DESCRIPTION OF THE PREFERRED EMBODIMENTS

In referring to the various figures of the drawing hereinbelow, like reference numerals are utilized to refer to identical parts of the apparatus.

Referring initially to FIG. 1, reference numeral 10 refers generally to an apparatus for tracking a moving object in an industrial automation system. In its simplest terms, the apparatus 10 is comprised of a light source 12, a retroreflective element 14 on a moving object 16, and a position-sensitive photodetector 18. Both the position-sensitive photodetector 18 and the light source 12 are mounted on a support apparatus 24. Generally speaking, the support 24 will be a device for performing some function relative to the moving object 16. The support 24 is generally movable parallel to the path of the moving object 16. The light source 12 projects a beam of light toward the path along which the retroreflective element 14 travels during the movement of the object 16. When the retroreflective element 14 intersects the beam of light, that beam of light is reflected back along a path toward the light source 12. However, due to the angular dispersion of the retroreflective element 14 the beam of light returning covers a wider area than just the light source 12. A portion of the reflected beam must be collected and focused by a lens 20 onto the position-sensitive photodetector 18. Therefore, in order that the amount of light collected by the lens 20 be adequate, it is necessary that the collecting lens 20 be located as closely adjacent to the axis of the light source 12 on the support 24 as is conveniently possible.

A retroreflective element, as that term is used in the present description, is any means by which a beam of light which is incident thereon is returned toward the source regardless of the position of the source. A wide variety of such elements are commonly found; however, most of these utilize one of two basic components to accomplish the function, a spherical or a cube corner reflector. These components are contained in stamped and molded parts such as automobile reflectors, in paints such as used for road signs, and in tape form. Any of these forms is acceptable in the present invention although the tape form containing a multitude of spherical beads dispersed uniformly over the surface is preferred because of its ease of application in manufacturing environment. An exemplary product of this type is sold under the tradename "Scotchlite" by Minnesota Mining and Manufacturing Co.

The photodetector utilized in the invention must be a detector which is sensitive to the position of a focused beam of light thereon. By this is meant that the output signal generated by the position-sensitive photodetector 18 must be indicative of the position of the focus of the returned beam of light on the detector which in turn must be indicative of the position of the retroreflective element 14 and the moving object 16 relative to the support 24. Within the purview of the invention, the position-sensitive photodetector 18 may take many forms. For example, a planar array of photodetector elements may be utilized or two axis position-sensing photodiode, such as United Detector Technology No. PIN-FC/25 which allows for locating and tracking an object in two dimensions. That is, whatever the movement of the object within a general plane of travel, the object could be located and tracked with the present system. Similarly, a three dimensional free space locating and tracking system may be achieved by combining such a two axis photodetector with an automatic focusing system or by orthogonally mounting a pair of such two axis detectors relative to one another and viewing the same spatial region from positions separated by 90° from one another. However, in the form in which the system has its greatest utility, the general direction of motion of the object 16 is known and is linear. Therefore, a linear position-sensitive photodiode such as a Schottky barrier photodiode, e.g., United Detector Technology, Inc., Model LSC-4, or a linear array of photodetector elements may be used. The Schottky barrier photodiode has the unique property of generating a signal that is proportional in sign and magnitude to the position, on the photodiode relative to some electronically established origin, of a light spot. This is depicted by the three terminals identified as A, O and B in FIG. 1. The quantity A–B, where A and B are the voltages at the respective terminals with respect to terminal O at origin, is proportional to the displacement of the focused image on the photodetector surface; hence, it is also proportional to the relative positional error of the support 24 relative to the moving object 16.

Since the apparatus 10 is intended for utilization in an industrial environment and since such an environment normally includes a great deal of light from a wide variety of sources, it is necessary that the apparatus includes some means 22 for discriminating against the stray light contained in the ambient environment so that the output from the photodiode 18 contains as much intelligible information as possible. In its simplest form, the means for discriminating against stray light consists of a simple black box 22 such as found in a box camera. In this way, only that stray light which is collectible by the lens 20 and focusable on the position-sensitive photodiode 18 is included in the output signal therefrom. This is necessary since the typical photodiode surface is responsive to a broad band of wavelengths even though the response curve tends to peak somewhere in this bandwidth.

Turning now to FIG. 2 of the drawing, a presently preferred embodiment 30 of the apparatus according to the invention is shown. In this embodiment, considerable care is taken in order to reduce the amount of stray light which is allowed to be incident on the position-sensitive photodetector 18 and to minimize the contribution of any stray light which is incident on the position-sensitive photodetector. Initially, this is accomplished by imposing a characteristic signature on the output of the light source. If such a signature is imposed on the output of the light source, the same signature is present in the light retroreflected by the element 14 received by the position-sensitive photodetector 18. Thereafter, that signature is also present in the output signal and electronic discrimination may be utilized in order to raise the signal to noise ratio accordingly.

In the embodiment shown in FIG. 2, the light source is composed of a low voltage incandescent lamp 32 having an elliptical reflector integral therewith. The output from the lamp 32 is focused by the elliptical reflector onto a first end of a fiber optic light pipe 34. The other end of the fiber optic light pipe is attached to a wedge reflector 36 which directs a restricted beam of light toward the path along which the retroreflective element 14 on the moving object 16 is to pass. A signature is impressed on this beam of light by placing an apertured chopper wheel 38 immediately prior to entry of the light into the first end of the fiber optic light pipe 34. An internally-damped hysteresis-synchronous motor 40 is utilized to drive the chopper wheel 38. Such a motor is chosen because of its characteristic of almost perfectly following the supply line frequency. Since that line frequency may also be supplied to the electronics which are utilized in interpreting and applying the output from the position-sensitive photodetector 18, an exact frequency base is established.

The frequency at which the light beam is chopped by the apertured chopper wheel 38 is selected so as to be above the frequency at which significant content of harmonics of the line frequency are found in various lighting sources. In the present embodiment, the chopper frequency is chosen to be 2,160 Hz. Experimental results have shown that the harmonic content from ordinary fluorescent and incandescent light sources at and above this frequency are essentially negligible. Therefore, by imposing a chopper frequency of 2,160 Hz, the system is able to discriminate against light from ordinary light sources in the ambient environment. The width of the apertures and the intervening spacing of the chopper wheel 38 in the preferred embodiment are each equal to the diameter of the first end of the light pipe 34. In this manner, a sinusoidal intensity is imposed upon the output beam directed toward the retroreflective element 14.

The output from a normal fiber optic light pipe such as shown at 34, is a cone, the angle of which is determined by the numerical aperture of the fiber optic pipe light 34. Necessarily, the extent of this cone should be greater than simply the width of the retroreflective element 14 since the retroreflective element 14 is at a distance from the end of the light pipe 34 and it is desired that the greatest intensity of light be distributed over an extended area through which the retroreflective element 14 passes. Furthermore, may position-sensitive photodiodes, such as the Schottky barrier diode, which may be utilized in the present invention are more sensitive to light at their extremities than near the central or zero position. Therefore, the sensitivity of the position-sensitive diode 18 may be increased by effectively increasing the intensity of the beam of light in the central portions so that an increased intensity is incident on the position-sensitive photodetector when the beam of light focused by the lens 20 is incident near center of the position-sensitive photodetector. The wedge reflector 36 serves to accomplish this function by folding the top and bottom portions of the cone of light emitted by the fiber optic light pipe 34 back upon the central portions of the cone so that a band or stripe of light is directed toward the retroreflective element 14. The form and construction of the wedge reflector 36 is found within copending patent application entitled "Wedge Reflector" by Edwin R. Bowerman, which is being filed concurrently with the present application and is assigned to the same assignee. The subject matter thereof is incorporated herein by reference.

The Schottky barrier diode of the present invention has its peak sensitivity in the near infrared portion of the electromagnetic spectrum. The ordinary output from fluorescent sources are at visible wavelengths and the near infrared output from incandescent sources is largely continuous. Therefore, the modulation eliminates the near infrared from incandescent sources. Therefore, discrimination is also made with respect to the wavelength of the light which is allowed to reach the position-sensitive photodetector 18. In the present embodiment, that is limited to near infrared wavelengths only and is accomplished by operating the low voltage incandescent light source 32 in a derated manner. That is, a 24 volt projector bulb is operated at an input voltage of approximately 5 volts. The gross amount of light emitted by the bulb 32 is decreasd; however, the reduction in infrared radiation emitted by the bulb 32 is less significant that the reduction in visible light emitted by the bulb 32. A second benefit is obtained by operating the bulb 32 in a derated manner. This advantage is that the life of the bulb 32 under derated operating conditions becomes indeterminately long thereby greatly enhancing the reliability of the overall system. A filter 41 which passes primarily near infrared radiation is emplaced in the beam received from the retroreflective element 14. Preferably this filter is emplaced at any point in the system where it may filter all of the light collected by the lens 20 for focusing on the position-sensitive photodetector 18. In addition, although it is not shown in the diagram of FIG. 2, a shroud, such as the box 22 in FIG. 1, is imposed around the position-sensitive photodetector 18 so as to preclude any stray light from reaching its surface directly.

Many photodiodes, such as the Schottky barrier photodiode utilized in the present embodiment, are sensitive to alterations in ambient temperature. Therefore, means are included in the present embodiment to maintain the position-sensitive photodetector 18 at a constant temperature. This means includes mounting the position-sensitive photodetector in a heat conductive block 42, such as aluminum, and attaching a thermoelectric cooler 44 to the block in order to maintain the temperature of the Schottky barrier diode 18 at approximately 20°C.

The output from the position-sensitive photodetector 18 is applied to a servosystem 46 which serves to analyze the output and to direct the movement of the support 24 to which the motor 40 and the position-sensitive photodetector 18 are mounted so that the detector may be moved into a synchronous relationship relative to the moving target 14. In this manner, the movement of the retroreflective element on the moving object may be accurately tracked so that a desired manufacturing function may be accomplished relative to that object during the period of time at which the support 24 is moving stably with respect to the object 16.

Alternatively, the light source may be a light emitting diode (LED), a laser, or other similar source. Such sources have the advantage that modulation may be effected electronically rather than mechanically thereby greatly affecting the reliability of the system. Furthermore, because such sources may be minaturized, the need for mounting the source adjacent to the collecting lens disappears. The source may now be mounted concentrically in the collecting optical system. The amount of retroreflected light lost by blockage at light source is more than offset by the increase in intensity of the retroreflected light collected because of the coaxial nature of the system.

While there have been shown and described what are considered to be preferred embodiments of the present invention, it will be obvious to those of ordinary skill in the art that various changes and modifications may be made therein without departing from the spirit of the invention as defined in the appended claims.

We Claim:

1. An apparatus for tracking a moving object in an industrial automation system comprising
   a support movable generally parallel to the movement to the object,
   a light source mounted on the support and directing a beam of light toward the object,
   a retroreflective element mounted on the object,
   a position-sensitive photodetector mounted on the support,
   means disposed on the support adjacent to the light source for focusing light reflected by the retroreflective element onto the position-sensitive photodetector, the position of the focus of the light on the position-sensitive photodetector and the output therefrom being indicative of the relative positions of the object and the support, and
   means responsive to the output from the position-sensitive photodetector for bringing the support into synchronous movement with the moving object.

2. An apparatus for tracking a moving object in an industrial automation system according to claim 1, wherein there is further included means for isolating light from the light source which has been retroreflected onto the position-sensitive photodetector from stray ambient light.

3. An apparatus for tracking a moving object in an industrial automation system according to claim 2, wherein the means for isolating includes means for modulating the beam of light at a specific frequency and wherein the means responsive to the output from the position-sensitive photodetector is sensitive only to a signal in a specific bandwidth of frequencies centered at the frequency of modulation of the beam of light.

4. An apparatus for tracking a moving object in an industrial automation system according to claim 3, wherein the frequency of modulation is above that generally attributable to any other light source in the operating environment.

5. An apparatus for tracking a moving object in an industrial automation system according to claim 3, wherein the light source is a light emitting diode.

6. An apparatus for tracking a moving object in an industrial automation system according to claim 3, wherein the light source includes an incandescent bulb, a fiber optic light guide for receiving light from the bulb and directing it toward the object and an elliptical reflector for focusing light from the bulb into the fiber optic light guide.

7. An apparatus for tracking a moving object in an industrial automation system according to claim 6, wherein the means for modulating the beam of light includes an apertured chopper wheel which is disposed between the light source and the fiber optic light guide and means for rotating the chopper wheel at a rate so that the beam of light is chopped at the specific frequency.

8. An apparatus for tracking a moving object in an industrial automation system according to claim 7, wherein the incandescent bulb is a low voltage bulb operated in a derated manner.

9. An apparatus for tracking a moving object in an industrial automation system according to claim 6, wherein there is further included means for folding the cone of light emitted by the fiber optic light guide to form a beam whose cross-section is extended in the direction of travel of the moving object and having increased intensity in the central portion of the beam.

10. An apparatus for tracking a moving object in an industrial automation system according to claim 9, wherein the means for folding includes a wedge reflector which is disposed at the termination of the fiber optic light guide, the wedge reflector having an entrance face through which light from the fiber optic light guide enters the reflector and a pair of planar reflective surfaces intersecting the entrance face along parallel lines which are also parallel with the direction of movement of the object and being narrowly divergent so that rays emitted from the fiber optic light guide at angles beyond a predetermined angle are reflected back toward the center of the beam thereby increasing the intensity of the beam particularly in the central portions thereof.

11. An apparatus for tracking a moving object in an industrial automation system according to claim 2, wherein the means for isolating includes means for preventing stray light from reaching the position-sensitive detector.

12. An apparatus for tracking a moving object in an industrial automation system according to claim 2, wherein a filter is interposed in the apparatus prior to the position-sensitive photodetector for blocking radiation of undesired wavelengths and passing light of desired wavelengths to the position-sensitive photodetector, the desired wavelengths being those contained only minimally in light emitted by other sources in the operating environment.

13. An apparatus for tracking a moving object in an industrial automation system according to claim 12, wherein the desired wavelengths are in the near infrared portion of the electromagnetic spectrum.

14. An apparatus for tracking a moving object in an industrial automation system according to claim 1, wherein the position-sensitive photodetector is a Schottky barrier photodiode.

15. An apparatus for tracking a moving object in an industrial automation system according to claim 14, wherein there is further included means for maintaining the Schottky barrier photodiode at a stable temperature.

16. An apparatus for tracking a moving object in an industrial automation system according to claim 1, wherein the retroreflective element is a piece of tape affixed to the object and having a layer of microscopic beads of material embedded therein.

17. An apparatus for tracking a moving object in an industrial automation system according to claim 1, wherein the retroreflective element is a cube corner reflector.

* * * * *

UNITED STATES PATENT OFFICE
CERTIFICATE OF CORRECTION

Patent No. 3,914,596            Dated October 21, 1975

Inventor(s) Finkel, Basch, Bowerman

It is certified that error appears in the above-identified patent and that said Letters Patent are hereby corrected as shown below:

Column 3, line 31, after "By this" insert --it--;
Column 5, line 17, change "may" to --many--; and
Column 5, line 54, change "decreasd" to --decreased--.

Signed and Sealed this twenty-seventh Day of January 1976

[SEAL]

Attest:

RUTH C. MASON
*Attesting Officer*

C. MARSHALL DANN
*Commissioner of Patents and Trademarks*